May 8, 1928.                              1,668,732
H. RABEZZANA
INDICATING DEVICE
Filed Jan. 4, 1924
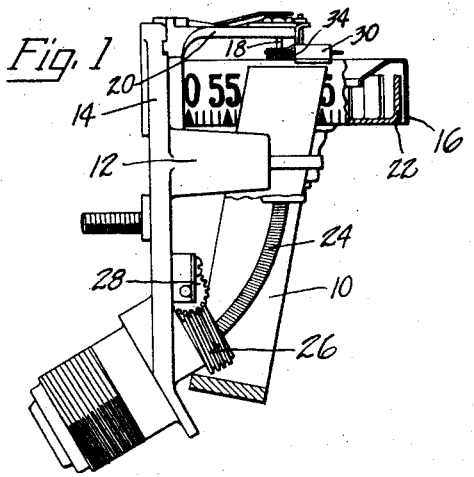
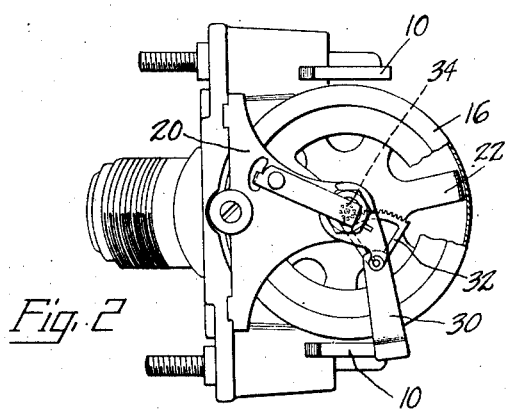
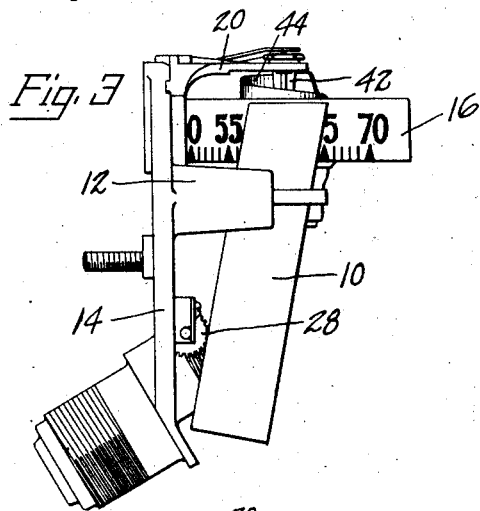
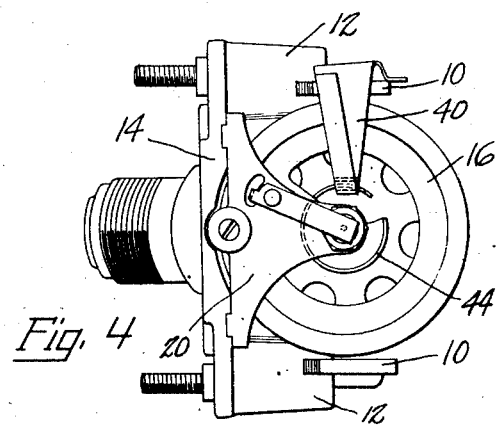
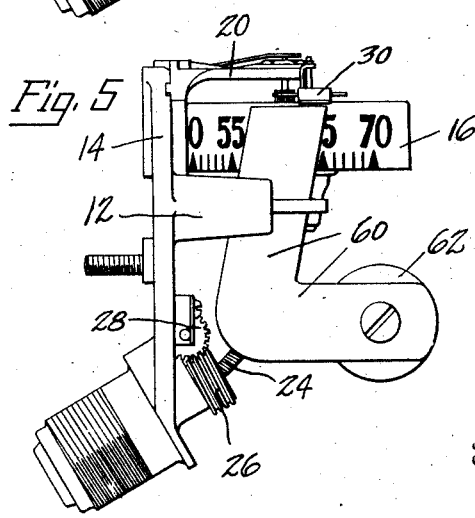
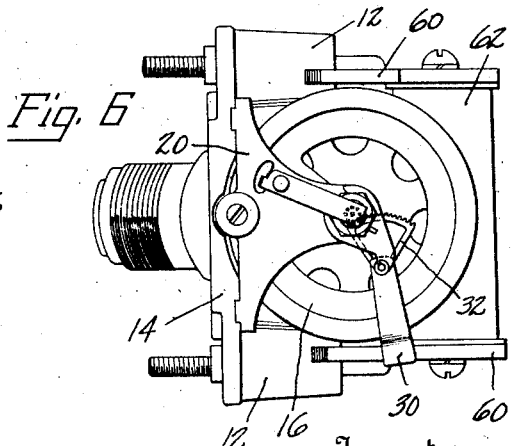
Inventor
Hector Rabezzana
By his Attorneys
Blackmore, Spencer & Flint Patented May 8, 1928.

1,668,732

UNITED STATES PATENT OFFICE.

HECTOR RABEZZANA, OF FLINT, MICHIGAN, ASSIGNOR, BY MESNE ASSIGNMENTS, TO A C SPARK PLUG CO., OF FLINT, MICHIGAN.

INDICATING DEVICE.

Application filed January 4, 1924. Serial No. 684,461.

This invention relates to indicating devices, and is illustrated as embodied in an automobile speedometer.

An object is to provide improved means for returning to zero position the indicating elements of such devices, and especially to arrange such means for automatic variation to compensate for changes, due to temperature or other causes, in the strength of the magnet or equivalent deflecting element.

In one desirable arrangement, magnetic means is provided for returning the indicating element to its zero position, the magnet being shown as stationary with its armature arranged to operate the indicating element, the magnet preferably being the same magnet as is used for creating the field of force by means of which the indicating element is deflected. Where the same magnet is used in this manner, variations in the deflecting field of force are automatically compensated for by corresponding variations in the resistance of the armature which controls the return movement of the indicating element.

In one form shown in the drawings, the armature is geared to the indicating element and extends into close proximity to one pole of the usual deflecting magnet. In another form, which is desirable in that the force urging the indicating element toward its zero position is substantially constant regardless of this element's angular position the armature is a cylindrical iron member of spiral form, i. e. it decreases regularly and progressively in thickness, and is arranged coaxially of the indicating element with an extension of one of the magnet poles in close proximity thereto.

Another object of the invention is to obviate the gradual weakening which takes place with a permanent magnet, by substituting therefor an electro-magnet so wound that the current from the usual automobile electrical system (ordinarily having a minimum of six volts due to the fact that the battery begins to discharge at that point) is sufficient completely to saturate the core of the electro-magnet. As increases of voltage beyond what is needed to secure complete saturation are of comparatively small effect, and in the usual automobile electrical system are small in amount, under ordinary circumstances this arrangement results in a magnet of nearly constant strength which is not weakened by age.

The above and other objects and features of the invention, including various novel combinations of parts and desirable particular constructions, will be apparent from the following description of the illustrative embodiments shown in the accompanying drawings, in which Fig. 1 is a side elevation of the operating parts of a speedometer having the above-described armature geared to the indicating element;

Fig. 2 is a top plan view of the parts shown in Fig. 1;

Fig. 3 is a side elevation of the operating parts of a modified form of speedometer, having the armature secured to the indicating element;

Fig. 4 is a top plan view of the parts shown in Fig. 3;

Fig. 5 is a side elevation of a modified form of speedometer having an electro-magnet; and Fig. 6 is a top plan view of the speedometer shown in Fig. 5.

In the form shown in Figs. 1 and 2, the invention is embodied in a speedometer having a permanent horseshoe magnet 10 held by brackets 12 on the rear panel 14. Between the two pole arms of the magnet an indicating element, such as the usual drag disk 16 having a mileage scale, is pivotally mounted on a short shaft 18 journaled at its lower end in a bracket (not shown) connecting the brackets 12 and at its upper end in a bracket 20. Arranged coaxially with respect to the drag disk 16, but not connected thereto, is a toothed iron disk 22, driven by a flexible shaft 24, which may also carry a worm 26 meshing with a worm wheel 28 on a cross shaft which, when the apparatus is in use, drives the odometer mechanism (not shown). The shaft 24 is driven in any suitable manner from the transmission, or from one of the front wheels. The above-described parts and their method of operation being well known to those skilled in the art, extended discussion is considered unnecessary.

According to one feature of the present invention, the indicating element 16 is urged toward its zero position by the magnet 10. In the arrangement of Figs. 1 and 2, there is an iron armature 30, pivotally supported on the bracket 20, and provided with a sector gear 32 meshing with a pinion 34 on shaft 18. The armature, in the zero position of element 16, is immediately above one of the poles of magnet 10. The angular movement of the armature 30 is confined to the immediate field of the magnet 10 where the attraction is comparatively uniform. As the indicating element is angularly displaced, according to the speed at which disk 22 is driven, the armature is constantly attracted by the magnet, and urges the indicating element toward its zero position, resisting its displacement. It will be seen that any change in the strength of the magnet, which would affect its deflecting force, will be accompanied by a corresponding change in the force attracting the armature, so that the deflecting force and the resisting force are still in the same ratio.

The form shown in Figs. 3 and 4 differs from that of Figs. 1 and 2 in that an extension 40 of one of the poles of magnet 10 is carried over the top of element 16, and provided with a pair of lugs 42 straddling an armature 44 of cylindrical form secured coaxially to element 16. Armature 44 has a spiral surface, that is, it decreases progressively in thickness. As the extension 40 attracts the thick part of the armature more strongly than the thin part, the armature 44 pulls around with element 16, urging it toward its zero position. This type of armature has the advantage that this torsional pull is constant in all angular positions of element 16, the decrease in thickness of the armature being regular, so that there is no variation in the resisting force to be considered in laying out the mileage scale.

The modification shown in Figs. 5 and 6 differs from that shown in Figs. 1 and 2, in that the permanent magnet 10 is replaced by an electro-magnet having a core extended to form pole arms 60 magnetized by a coil 62 energized by the electrical system of the car on which the speedometer is mounted. On all cars there is a minimum voltage in this system, six volts being a common value, and the coil 62 is so wound that at this voltage the core 60 is saturated magnetically, thus obviating the gradual weakening which takes place with a permanent magnet. The strength of the magnetic field does not vary greatly with an electro-magnet, partly because in any case the strength increases comparatively slowly with increasing voltage in a saturated magnet, and partly because all automobile electrical systems are provided with means for limiting increases in voltage with increasing speed. Thus if the minimum is six volts, the maximum is often held at or below ten volts. It should be noted also that any slight increase in the strength of the field of the electro-magnet is in this design substantially compensated for by a corresponding increase in the attraction for armature 30.

While several illustrative embodiments of my invention have been described, it is not my intention to limit its scope to those embodiments, or otherwise than by the terms of the appended claims.

I claim:

1. In a measuring instrument, a magnet, a rotating graduated indicating member, a driven armature to control the effective magnet field influencing the rotation of the indicating member, and a second armature actuated by the indicating member and variably positioned relative to the magnet by the rotation of the indicating member to bias the indicating member to its zero reading.

2. An indicating device comprising, in combination, a drag element, means including a magnet for deflecting the drag element, a magnetic armature and gearing the drag element and armature, the armature being arranged to be attracted by the magnet for resisting deflection of the drag element.

3. An indicating device comprising, in combination, a pivotally mounted drag element, means including a magnet for deflecting the drag element, and a magnetic armature movable simultaneously with the movements of the drag element and in operative proximity to a pole of the magnet.

4. An indicating device comprising, in combination, a horse shoe magnet having parallel pole arms, a dial element pivotally mounted between the arms, means to cause the field of force of the magnet to deflect the dial element, and an armature operably connected to the dial element and extending across the top thereof into proximity to one of the magnet arms.

In testimony whereof I affix my signature.

HECTOR RABEZZANA.

CERTIFICATE OF CORRECTION.

Patent No. 1,668,732.                                        Granted May 8, 1928, to

HECTOR RABEZZANA.

It is hereby certified that error appears in the printed specification of the above numbered patent requiring correction as follows: Page 2, line 87, claim 2, after the word "gearing" insert the word "between"; and the said Letters Patent should be read with this correction therein that the same may conform to the record of the case in the Patent Office.

Signed and sealed this 23rd day of October, A. D. 1928.

(Seal)                                                          M. J. Moore,
Acting Commissioner of Patents.